Jan. 3, 1939.                  H. W. HARMAN                 2,142,896
FASTENING
Filed Aug. 7, 1937
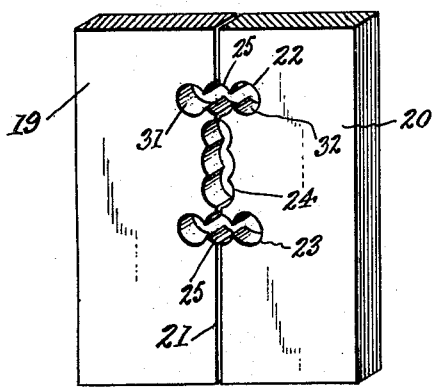
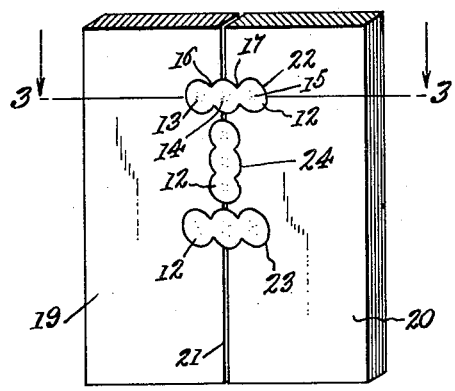
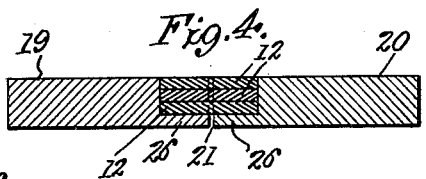
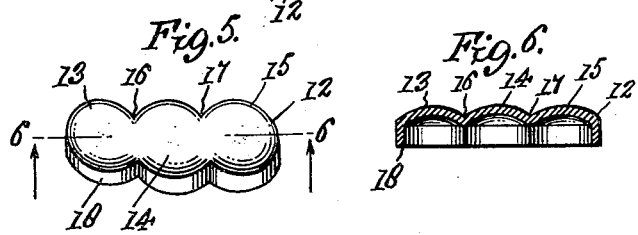
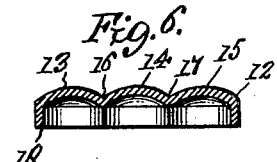
Inventor
Hal W. Harman
By Wilkinson & Mawhinney
Attorneys.

Patented Jan. 3, 1939

2,142,896

UNITED STATES PATENT OFFICE 2,142,896

FASTENING

Hal W. Harman, El Paso, Tex.

Application August 7, 1937, Serial No. 157,972

6 Claims. (Cl. 85—5)

The present invention relates to improvements in fastenings and methods for producing the same, and has for an object to provide an improved fastening for joining two pieces of metal, or for joining the two separated parts of a piece of metal across a crack, including the steps and processes of the method by which an effective locking of the two parts of the metal is secured without the use of heat.

Another object of the invention resides in certain improved steps and processes of a cold method for the application of locking fastenings to two parts of metal to be joined together in which such steps and processes are few, simple and economical, being designed to be carried out in a very short space of time.

An important object of the invention is to increase the tensile strength of the metal parts to a very high degree due to the tensile strength of the locking fastenings which are applied and spread by a cold method to the joint.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a fragmentary perspective view of two pieces of metal initially drilled for receiving the improved locking fastenings.

Figure 2 is a similar view showing a subsequent step in the method in which the fastening is completed.

Figure 3 is a sectional view taken through two pieces of metal with the locking fastenings applied therein in drill holes made completely through the pieces.

Figure 4 is a similar view in which the drill holes do not pass completely through the metal pieces.

Figure 5 is a perspective view of the improved locking fastening.

Figure 6 is a longitudinal section taken on the line 6—6 in Figure 5.

Referring more particularly to the drawing, and for the present to Figures 5 and 6, 12 designates generally one of the improved locking fastenings which is made up of appropriate metal of desired gauge or thickness, and includes a number of bulged or enlarged locking parts separated by diminished connecting necks. In the instance illustrated, three such bulged or enlarged parts 13, 14 and 15 are employed, being connected with one another by the reduced necks 16 and 17. The locking fastenings are cup-shaped, as shown in Figure 6 having the flanges 18 extending at substantially right angles to the general plane of the bulged or enlarged portions. The bulged or enlarged portions may be of the concavo-convex form shown in Figure 6 for a double purpose; first, to add stability to the fastening as a unit independent of the repair in which it is used; and secondly to give lateral spread or extension to the fastenings when hammered down. In other words these fastenings are commercial units which are punched or stamped out of flat metal to the form shown in Figures 5 and 6 and they must possess a sufficient rigidity to maintain their commercial form until applied to the repair. Both the flange 18 and the concavo-convex construction of the enlarged or bulged portions will tend to impart this stability. The cupped form of the fastening increases its dimensions when it is flattened to enable it to fit tightly into the lock design as hereinafter explained.

The most desirable metal for making these locking fastenings is a metal or alloy of metals that has a high ductility, possesses strength, and has the quality of becoming stronger and harder when worked cold. Such characteristics or properties are found principally in the alloys of nickel iron, nickel steel, chromium nickel iron and chromium nickel steel. These alloys possess a tensile strength of from 80 to 95 thousand pounds per square inch when annealed. When hammer drawn cold, the tensile strength can be increased on some of these alloys to as high as 300 thousand pounds per square inch. Also, the hardness may be increased from 135 to 460 Brinell hardness test.

In Figure 1 is shown two pieces or two parts of metal 19 and 20 to be joined together, or 19 and 20 may represent two separated parts of a cylinder block or the like in which has developed a crack 21.

As shown in Figure 1 the metal parts 19 and 20 are drilled in accordance with a machined designed which corresponds generally with the configuration of the unitary locking fastening 12. As many of these machined designs may be drilled into the metal parts 19 and 20 across the crack 21 as deemed desirable. In Figure 1 three such machined designs are produced. Two of these designs 22 and 23 extend cross-wise of the crack 21 and act in a locking capacity to hold the two pieces 19 and 20 of the metal together and from moving apart. The intermediate design 24 is disposed lengthwise of the crack 21 and acts in a sealing capacity.

These machined designs may be produced in any appropriate manner.

The fastenings in the designs 22 and 23 extend across the crack 21 and act to tightly lock the metal parts 19 and 20 at opposite sides of the crack 21, preventing it from opening or expanding at the crack, and at the same time imparting to the repair part tensile strength of the fastening at its smallest part. By employing a metal of high tensile strength in the making of the fastenings, more tensile strength may be imparted to the repair. By knowing the tensile strength of the metal of the fastenings and by calculating the square of the fastening at its smallest part, the tensile strength of the repair may be calculated with mathematical exactness. This is impossible to do with any other type of repair or weld.

The repair is extremely elastic and strong, yet it does not leave any strain in the parts as it tightly locks the parts 19 and 20 together in the precise relation to their original parts. Therefore, there are no strains created on the part of the process, as is the case when castings are welded.

The invention may be used for a number of purposes, for instance the repairing of cracked or broken castings, such as motor cylinder blocks and heads, Diesel engine cylinders and heads, steam cylinders and heads, steam boilers, sectional heating boilers, hot water heating boilers, pump housings of all kinds, including mud pumps as used with the rotary pipe drilling rigs for the drilling of deep wells, the repairing of ore and rock crusher housings, locomotive frames, slag pots as used to haul the hot slag from the furnace to the slag dump of smelters, the repairing of engine beds and frames. The repair will impart the same, or if desired greater tensile strength to the repaired part compared with that it originally possessed.

The invention also is applicable to the joining of two separate pieces of metal or any other solid substances that are machineable. In such case the improved device will impart to the joint the necessary tensile strength without the use of bolts, rivets, rivet-on-patches. On the contrary the entire repair according to the present invention will be made within the crack or break and within the casting or parts to be joined together. After the application of the fastenings, the same may be ground smooth forming a leak-proof joint and imparting great tensile strength.

By installing the locking fastenings 12 in their laminations, each fastening is completely cold drawn to the limit, and the highest possible tensile strength is obtained; and due to the surface increase by use of the laminations, a still greater strength is obtained. Thus it is obvious that a joint can be made according to the present invention that will possess greater strength than the iron as the tensile strength of cast iron is much lower than the annealed alloys.

Another important feature of the invention is that the greater the strain on the joint, the greater the sealing quality, as the strain from the right side of the joint will react through the locking fastenings to the left side of the joint and vice versa. This causes a pulling together of the joint when a strain is applied. Therefore, the greater the strain, the greater the sealing quality.

Of course, it will be understood that the locking fastening 12 may be composed of three or more intersecting circles or enlarged portions; or the fastening might be composed of two such portions.

The invention will be effective for the connecting of railroad rails and will eliminate the "click" caused by the car wheels as they pass over the gap between the rails. The improved lock will largely replace the present bolt, rivet and weld. The device could be used upon bridges. The joining of the steel spans of a bridge could be punched to receive the locking fastenings. A locking fastening, thick as the metal, could be hammered into the design, by two men, thus eliminating the heating and throwing of hot rivets. This procedure would sharply step up the assembling of structural steel work of any kind.

The locking fastening or fastener will preferably be slightly undersized with respect to the opening into which it is inserted so that the expansion of the fastener will not widen the crack or separation 21 between the two parts 19 and 20 of the stock, but will effectually fill the space 21 and thus not only lock the two parts 19 and 20 together but will completely seal the opening or fissure 21 between these parts.

The improved fastener is not designed to draw the two parts 19 and 20 of the stock together for the purpose of closing the separation or fissure 21. As a matter of fact, in castings for instance, breaks or cracks occur from strains originally inherent in the casting, and it is not desired to pull this crack together again, because to do so would be to restore the original strain. Therefore the improved fastening takes into account the undesired original strain in the casting from which the break or crack occurred and leaves the separation or crack 21 in an open condition, filling the same completely all the way up and down with the improved fasteners. The fasteners therefore subserve two functions; first, to fill, that is to seal, the fissure or separation 21; and secondly, to add structural strength to the casting or stock by eliminating the original strain and coupling the two parts 19 and 20 tightly together in a manner often more forcible than the original strength of casting.

In accordance with the present invention the holes 25, 31 and 32 are drilled in the castings or stock. These holes are round. The holes are also overlapping so that the three holes form one continuous opening composed of bulged and restricted parts all connected together.

As shown in Figures 1 and 2, the crosswise openings preferably consist of at least three bulged portions, of which the intermediate or central bulged portion occurs at the fissure or separation 21. The purpose of this arrangement is that the constricted portions are spaced from the fissure or separation 21 and these constricted portions provide bearing parts for the fastener, which bearing parts are a substantial distance from the fissure or separation 21 thereby providing sufficient stock to prevent rupture.

The bulged portions of the fastener are expansible by pressure. The fastener may be of the concavo-convex form shown or of any other form as there are various ways in which vertical or other pressure may expand metal. Each bulged portion of the fastener is expansible, and each bulged portion is individually expansible. Where the bulged portions of the fastener are made of the circular form as shown in the embodiment of the drawing herein illustrated, the expansion may take place radially outward in all directions although the fastener remains one-piece of metal and in effect a single fastener extending to all bulged portions of the opening. The expansion of the fastener fills the opening completely and makes a leak-proof repair.

It is to be understood that the fastener will substantially conform to the outline of the opening, although a square or any other form of fastener may be used provided the fastener when expanded will fill the opening.

In Figures 1 and 2 there is a small distance shown between the middle seal and each of the transverse locks. The parts may be welded at and about these spaces if desired or the seal and the locks might contact at these points. Also holes might be drilled at these points and bolts screwed into the holes to seal the openings somewhat in accordance with my prior Patent No. 2,011,484, granted August 13, 1935.

It is obvious that various changes and modifications may be made in the details of construction and design of the above specifically described embodiment of this invention without departing from the spirit thereof, such changes and modifications being restricted only by the scope of the following claims.

What is claimed is:

1. An improved locking fastener comprising a body of substantially thin metal composed of bulged and connected restricted portions, said bulged portions being expansible by pressure, in combination with two separated parts of stock across which is drilled an opening substantially conforming in size and shape to said fastener, and into which opening said fastener is inserted and compressed.

2. An improved locking fastener comprising a body of substantially thin metal composed of bulged and connected restricted portions, said bulged portions being expansible by pressure and adapted to be flattened out to increase the overall dimensions of the bulged and restricted portions, in combination with two separate parts of stock across which is drilled an opening slightly larger than the fastener and into which the fastener is inserted and expanded.

3. An improved locking fastener comprising a body of substantially thin metal composed of bulged and connected restricted portions, said bulged portions being concavo-convex in cross-section and adapted to be flattened out to increase the overall dimensions of the bulged and restricted portions, in combination with two separate parts of stock across which is drilled an opening conforming substantially in configuration to said locking fastener, into which opening said fastener is inserted and flattened thereby tightening the locking fastener in the opening.

4. An improved locking fastener comprising a body of substantially thin metal composed of bulged and connected restricted portions, said bulged portions being substantially concavo-convex in cross section, said bulged portions having flanges extending down therefrom, said flanges and said portions adapted to be beaten and compressed into a substantially common plane to increase the overall dimensions of the fastener, in combination with two separated parts of stock across which is drilled an opening slightly larger than the fastener, into which opening the fastener is inserted and expanded outward into all parts of said opening.

5. In combination with two separated parts of stock across which are drilled a plurality of holes in overlapping relation forming a connected continuous opening having bulged and constricted parts, an intermediate bulged part coinciding with the separation between the parts of stock, the constricted portions at opposite sides of the intermediate bulged part being spaced to opposite sides of the separation, an improved locking fastener comprising a continuous body of substantially thin metal composed of bulged and connected restricted portions generally conforming to the bulged and constricted portions of said opening, said bulged portions being each expansible by pressure and adapted to be beaten and expanded to increase the overall dimensions of said bulged portions in all radial directions, said fastener being of initially smaller size than said opening.

6. In combination with two parts of stock having a separation between the same, said stock having drilled therein a number of crosswise and longitudinal openings, each opening made up of at least three round holes drilled in overlapping relation to form a continuous opening composed of alternating bulged and constricted portions, and locking fasteners for said openings, said locking fasteners being of thin material as compared with the depth of the stock requiring a plurality of fasteners to be overlaid one upon the other to fill the openings, said fasteners being of metal and composed of bulged and constricted portions and being smaller in dimensions than said openings but being expansible under compressive pressure whereby to flatten out against all parts of the openings into which they are inserted.

HAL W. HARMAN.